US009730297B2

(12) United States Patent
Brand et al.

(10) Patent No.: US 9,730,297 B2
(45) Date of Patent: Aug. 8, 2017

(54) LUMINAIRE CONTROLLERS (71) Applicant: SCHREDER, Brussels (BE)

(72) Inventors: Daniel Brand, Cologne (GE); Helmut Schroeder, Wiesbaden (DE)

(73) Assignee: SCHREDER, Brussels (BE)

( * ) Notice: Subject to any disclaimer, the term of this patent is extended or adjusted under 35 U.S.C. 154(b) by 0 days.

(21) Appl. No.: 14/914,828

(22) PCT Filed: Aug. 29, 2013

(86) PCT No.: PCT/EP2013/067903
§ 371 (c)(1),
(2) Date: Feb. 26, 2016

(87) PCT Pub. No.: WO2015/028067
PCT Pub. Date: Mar. 5, 2015

(65) Prior Publication Data
US 2016/0219674 A1    Jul. 28, 2016

(51) Int. Cl.
*H05B 37/02* (2006.01)
*F21V 23/04* (2006.01)
(Continued)

(52) U.S. Cl.
CPC .......... *H05B 37/0218* (2013.01); *F21S 8/086* (2013.01); *F21V 23/0464* (2013.01);
(Continued)

(58) Field of Classification Search
CPC ............ H05B 37/0272; H05B 33/0854; H05B 37/0227; H05B 33/0803; H05B 37/0281;
(Continued)

(56) References Cited

U.S. PATENT DOCUMENTS 3,621,269 A    11/1971 Misencik
5,585,697 A    12/1996 Cote et al.
(Continued)

FOREIGN PATENT DOCUMENTS

DE          19644971 A1    5/1998
NL           8403919 A     7/1986
WO    WO2013046339 A1    4/2013

OTHER PUBLICATIONS

ISA/EP International Search Report issued May 14, 2014 re PCT Application No. PCT/EP2013/067903, filed Aug. 29, 2013.

*Primary Examiner* — Jany Richardson
(74) *Attorney, Agent, or Firm* — Patrick J. Daugherty; Driggs, Hogg, Daugherty & Del Zoppo Co., LPA (57) ABSTRACT

Described herein is a luminaire controller which is mountable within a luminaire head by means of fastening areas provided in a wall forming part of an upper housing part and/or a baseplate, the upper housing part and the baseplate forming a body for the luminaire controller. A flexible light guide is provided for transmitting light from the exterior of the luminaire head to a light sensor located within the controller. A lens may be provided at one end of the light guide at the wall of the luminaire head with the other end of the light guide being adjacent the light sensor. A terminal strip and an antenna jack are provided to which respective electrical connections can be made and an antenna can be connected by means of an antenna cable.

20 Claims, 6 Drawing Sheets

(51) Int. Cl.
    *F21S 8/08*           (2006.01)
    *G01J 1/02*           (2006.01)
    *G01J 1/04*           (2006.01)
    *F21W 131/103*     (2006.01)

(52) U.S. Cl.
    CPC ........... *G01J 1/0295* (2013.01); *G01J 1/0425* (2013.01); *H05B 37/0272* (2013.01); *F21W 2131/103* (2013.01); *Y02B 20/46* (2013.01)

(58) Field of Classification Search
    CPC ............ H05B 33/0845; H05B 33/0809; H05B 33/0872; H05B 37/03; H05B 33/0842; H05B 33/089; H05B 37/0218; H05B 33/0857
    See application file for complete search history.

(56) References Cited

U.S. PATENT DOCUMENTS

| | | | |
|---|---|---|---|
| 2002/0003214 A1 | 1/2002 | Morrissey et al. | |
| 2012/0043889 A1* | 2/2012 | Recker | H05B 33/0815 315/86 |
| 2013/0040471 A1 | 2/2013 | Gervais et al. | |
| 2015/0077967 A1* | 3/2015 | Pellenc | H05B 33/0842 362/20 |
| 2016/0150621 A1* | 5/2016 | Zhang | H05B 37/0227 315/149 |

* cited by examiner

LUMINAIRE CONTROLLERS

FIELD OF THE INVENTION

The present invention relates to luminaire controllers, and is more particularly, although not exclusively, concerned with street lights having such a luminaire controller, and to a method for controlling a luminaire in a street light.

BACKGROUND OF THE INVENTION

Street lights are known on the market in which a luminaire head including at least one lamp, preferably, an LED or gas discharge lamp, has attached to it a photosensor or light sensor unit which can transmit a signal to a controller located inside the luminaire head. The visual impression of these photosensor units is capable of being improved. Some luminaire heads, in particular, when covered by cooling fins or photovoltaic cells, are not suitable for the additional attachment of a photosensor unit without incurring substantial manufacturing and installation costs for the integration of a photosensor unit and associated luminaire controller.

SUMMARY OF THE INVENTION

The object underlying the present invention is to provide a controller which can replace the disadvantageous controller of the prior art.

In accordance with one aspect, there is provided a luminaire controller mountable within a luminaire housing, the luminaire controller comprising a light sensor for providing a signal relating to ambient light levels, characterized in that the luminaire controller further comprises a light guide having a light inlet through which ambient light can be received and a light outlet through which ambient light is directed to the light sensor.

In accordance with another aspect, there is provided a method for controlling a luminaire comprising a lamp and a luminaire controller as described above, characterized in that the method comprises passing ambient light to the light sensor of the luminaire controller via a light guide, the light sensor emitting a signal relating to the ambient light level, and varying the light intensity of the lamp in accordance with the signal relating to the ambient light level.

In accordance with a further aspect, there is provided a luminaire characterized by a luminaire controller as described above.

In accordance with a yet further aspect, there is provided a street light comprising a luminaire as described above.

Advantageous embodiments of the present invention become apparent from the dependent sub-claims and the following description of the figures.

In accordance with the invention, it is provided that the light sensor is designed as part of the controller and that this controller is assigned a light guide providing a light inlet through which ambient light is received and a light outlet through which ambient light can reach the light sensor. The light sensor can thus be arranged as part of the controller inside the luminaire head, while the light guide itself transports ambient light (hereinafter also referred to as "light") to the light sensor. This results in a number of advantages. In particular, the design of the controller in accordance with the invention, with an integrated light sensor, is simplified, as only one component has to be provided. By utilising optical wave guides, for example, fibre-optic wave guides, of varying length, as required, the controllers can flexibly be mounted within different luminaire heads. In addition, if the optical wave guides are flexible, it is possible to easily accommodate bends etc. which are required for providing an optimum connection between the light guide and the integrated light sensor.

By dispensing with an external photosensor or light sensor unit, the exterior of a luminaire head is only slightly impaired, as only a small opening needs to be provided for the light guide and its associated parts, for example, the lens located at the light inlet area thereof.

Preferably, the light inlet of the light guide is provided with fastening means for fastening the light guide in an opening of the luminaire housing. The fastening means can be, for example, a screw means provided with a central passage for receiving the light guide, and by which means the light guide is accommodated in the opening in the luminaire housing.

Associated means for processing a signal generated by the light sensor are provided by the controller and are thus in the operating position, that is, inside the luminaire head, after installation of the controller. The space available on the housing of the luminaire head is only occupied to a minimal extent by the light guide.

Advantageously, the light guide has, at its light inlet, a lens preferably provided with a convex surface which is connected upstream of the light guide such that ambient light collected by the lens enters the light inlet. Even the supplementary use of a lens leading to a targeted guidance of the ambient light into the light guide only negligibly reduces the space available on the surface of the luminaire head.

The lens may be a convex lens or a plano-convex lens having its convex surface on the surface of the luminaire head. Naturally, the power (and hence the focal length) of the lens is chosen to optimise the amount of light being directed into the light inlet of the light guide.

The lens itself can also be part of the fastening means of the light guide, when the lens itself is, for example, arranged in a socket which is mountable to the housing of the luminaire head and the light guide is arranged in a receptacle associated with the lens.

Alternatively, the lens and light guide can be positioned in a holder for optimum guidance of the ambient light. In this case, the lens and light guide as well as the holder in which they are positioned match one another inside fastening means which, in turn, is arranged in the luminaire housing or wall of the luminaire head.

The positioning of the controller inside the luminaire head can be facilitated as the light guide is, according to an advantageous development, designed flexibly, and, in particular, as a fibre wave guide. A flexible light guide is understood here as being a bendable light guide.

Advantageously, the controller has a receptacle into which the end of the light guide comprising the light outlet is plugged in an operational position inside the luminaire housing. This receptacle may be, for example, fastened directly on a board of the controller on which the light sensor is also arranged, contributing to a compact design of the controller. The receptacle can, however, also be part of a housing of the controller or of a light sensor component of the controller. The receptacle can be designed for simple plugging in of the light guide with a clamping-type fastening of the light guide, so that during fitting of the light guide the latter can be simply plugged into the associated part of the controller.

In an advantageous embodiment of the controller, the controller is provided with a communications unit for communicating with a communications network. This allows not only the signals from the light sensor of one controller to be passed on to other controllers and used for controlling a group of luminaires, but also the profiles for switching the luminaire to be predetermined from outside, taking into account the signals of the light sensor.

Due to the greater adaptability of a controller provided with a design in accordance with the invention to a plurality of luminaires, in particular, in the field of street lighting, more luminaires can be selectively adapted to the locally prevailing light levels or brightness conditions. For example, the controller can, when a certain threshold value is reached which reflects an ambient light level or brightness measured by the light sensor, emit a signal for switching the lamp on or off and accordingly control an associated ballast.

Advantageously, the controller has a dimming interface for emitting a dimming signal that can be or is determined depending on the signal relating to the ambient light level or brightness signal from the light sensor. For this purpose, the controller has data processing means by which a signal from the light sensor reflecting the ambient light level or brightness is transformed into a dimming signal. For example, functional correlations between ambient light levels or brightness and dimming signal or dimming level are stored in the controller and used to determine the light intensity of the lamp depending on the ambient light level or brightness. To do so, the light outlet of the light guide must preferably be arranged such that the light detected by the light sensor originates exclusively from the surroundings of the luminaire and not from the luminaire itself. The light inlet of the light guide is located on a side opposite the light radiation direction of the luminaire, in particular, on the top of the luminaire head in the case of street lights. Associated memory and/or microprocessor means is provided for storing and processing of associated data and which can also be controlled externally using a communications network, and, hence be checked or varied. The controller thus has a dimming interface using a dimming signal that can be understood by an associated ballast, for example, in accordance with standard protocols such as a 0-10V, 1-10V or DALI.

For communications purposes, a controller in accordance with the invention comprises an antenna jack via which an antenna can be connectable, in particular, by means of a flexible cable. This also results in a more flexible fitting capability of the controller inside the luminaire head. Alternatively or additionally, the controller can have other communications interfaces for communications signals that may be separately cable-linked or applied to the supply cable.

The light guide of the controller in accordance with the invention can have integrated upstream and/or downstream light filters which may be used to filter out disturbing light. In particular, the light filters can be used, for example, to filter infrared light, which can lead to a deterioration of the measuring signal of the visible light.

Moreover, a plurality of light guides, or one or more light guides with more than one light inlet, can be assigned to the light sensor. In addition, more than one light sensor may also be provided, each light sensor having an associated light guide with a light inlet at an opening in the luminaire housing. The use of several light inlets, whose light signal can, alternatively or additionally, also be received by several light sensors, enables the controller to incorporate more than one varying ambient light level or brightness into a light scenario. For example, not only can the brightness of the lamp be regulated depending on the ambient light level or brightness, such as daylight and night-time brightness, but also laterally entering light from artificial lighting sources can be detected and taken into account by appropriate control software of the controller.

The problems mentioned above are also solved by a method for controlling a lamp of a luminaire, in particular of a street light, where the luminaire has a lamp and a controller as described above, and where the method is characterized in that light from outside the luminaire is passed to a light sensor of the controller via a light guide and the controller emits a signal varying the light intensity of the lamp depending on the signal relating to the ambient light level or brightness.

By this method, the arrangement of a controller equipped with a light sensor is improved in comparison with the prior art. The controller can be more variably arranged inside the housing, while at the same time the space required on the surface of the luminaire head can be reduced. More luminaires can therefore be controlled in dependence on the ambient light level or brightness.

The controller is preferably designed for checking the network communications, and, in the event of an interrupted network communication, emits a switch-on and switch-off signal for the lamp depending on the signal relating to the ambient light level or brightness. An emergency program of this type is particularly useful for otherwise centrally controlled and managed street lights. Checking of the network communication can be based on known routines and presupposes that the controller or an associated interface unit has a regulatory system which generates an appropriate signal if the network is faulty or not existing. For example, this can be a regulatory system conforming to the ZigBee standard, so that the controller can be part of a ZigBee network. [ZigBee is a trademark of the ZigBee Alliance which provides a specification for a suite of high level communication protocols using small, low-power digital radios based on an IEEE 802 standard for personal area networks. ZigBee is particularly useful in radio frequency (RF) applications where low data rates, long battery life and secure networking are required, and where periodic or intermittent data transmission or a single signal transmission is required from a sensor or other input device.]

The required brightness of a street light can also be provided in the event of a failure of the network by adapting to the ambient light level or brightness, in that the controller passes on the necessary signals for control, that is, for ambient light level or brightness-based operation of the lamp, to a ballast. In a highly integrated variant, the controller can incorporate the ballast itself, so the appropriate interfaces for communication with a ballast can be dispensed with. When a predetermined threshold value is reached or exceeded, the lamp is switched on or off without the network.

In addition to switching on and off, a dimming signal of the controller is preferably determined depending on the signal relating to the ambient light level or brightness. A dimming signal is understood here as being a signal which leads to a light intensity between the extreme values "lamp off" and "lamp with maximum brightness". For this, programs with appropriate assignments or appropriate circuits can be stored and/or provided in the controller. The signal from the light sensor is, for example, assigned to a required dimming level or to a required brightness of the lamp using a clear-cut function. The required brightness or, negatively formulated, the required dimming level can then be emitted to the ballast via the dimming interface.

In an advantageous development of the method in accordance with the invention, this method is characterized in that, for calibration of the light sensor, a measurement value of the light sensor is recorded at a point in time which is externally predetermined, in particular, at the time the lamp is switched on, and is used as the new reference value. This allows an error resulting from ageing of the light sensor to be corrected. The method step in accordance with the invention can be carried out using a network order from outside or can take place at a pre-programmed time. The new reference value defines, for example, a switch-on threshold for emission of a switch-on signal to a ballast of the luminaire.

Alternatively or additionally, a switch-on threshold for switching on after installation of the controller can be changed by means of control software, in particular, by radio means, for example, a radio link. The control software can be part of a street light management software or a program usable for maintenance purposes and which can preferably communicate with the controller via a radio link to vary values and functions stored therein for controlling the output signals to a ballast. This leads to simplified maintenance, where the maintenance personnel on the spot can check and adjust the controller without having to touch the controller in the luminaire head directly.

Finally, the object defined at the outset is also achieved by a street light having a controller as described above or below. The street light or an associated networked street lighting system can also have the advantages as described above or below, in particular, street lights equipped or operated in accordance with the invention are less impaired in their appearance.

BRIEF DESCRIPTION OF THE DRAWINGS

Exemplary embodiments of the present invention are schematically illustrated in the following figures.

DESCRIPTION OF THE INVENTION

Individual technical features of the exemplary embodiments described below can also be combined with previously described exemplary embodiments together with the features of the independent Claims and dependent Claims to provide additional subject matter in accordance with the invention.

In the following description, elements having identical function are provided with identical reference numerals.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Figure 1:
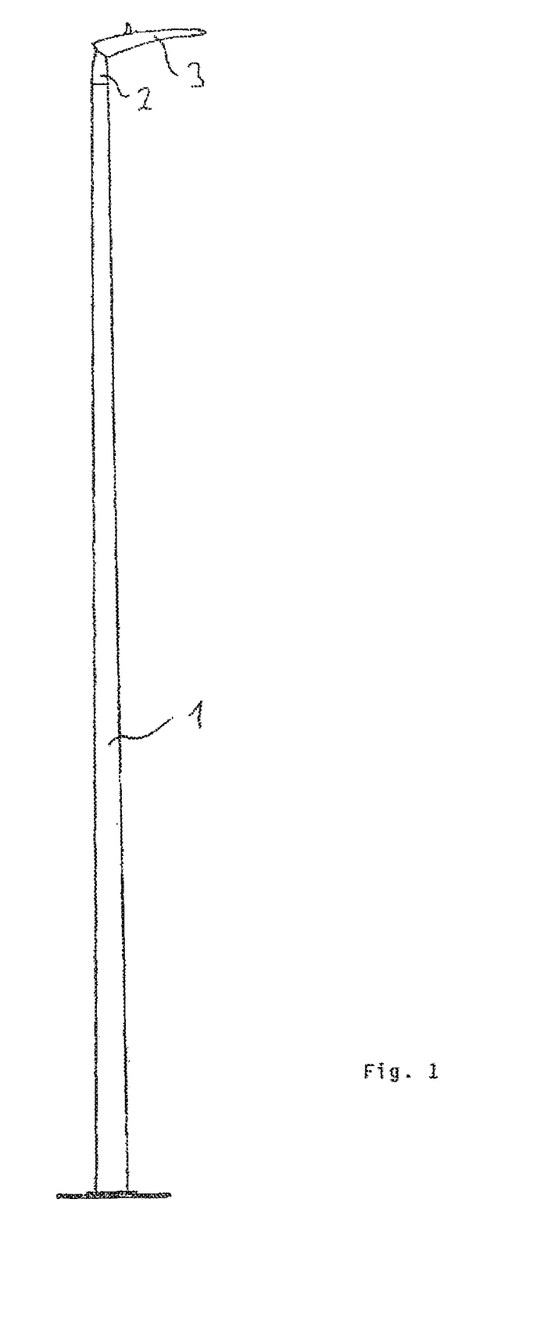
FIG. 1 shows a street light in accordance with the present invention.

A street light is shown FIG. 1 which comprises a light pole 1 having an upper end 2 to which a luminaire housing in the form of a luminaire head 3 is mounted. Inside this luminaire head 3, a controller in accordance with the invention is integrated as will be described in more detail below. The luminaire head 3 can also be arranged underneath the upper end 2 of the light pole 1 at a pole arm (not shown).

Figure 2:
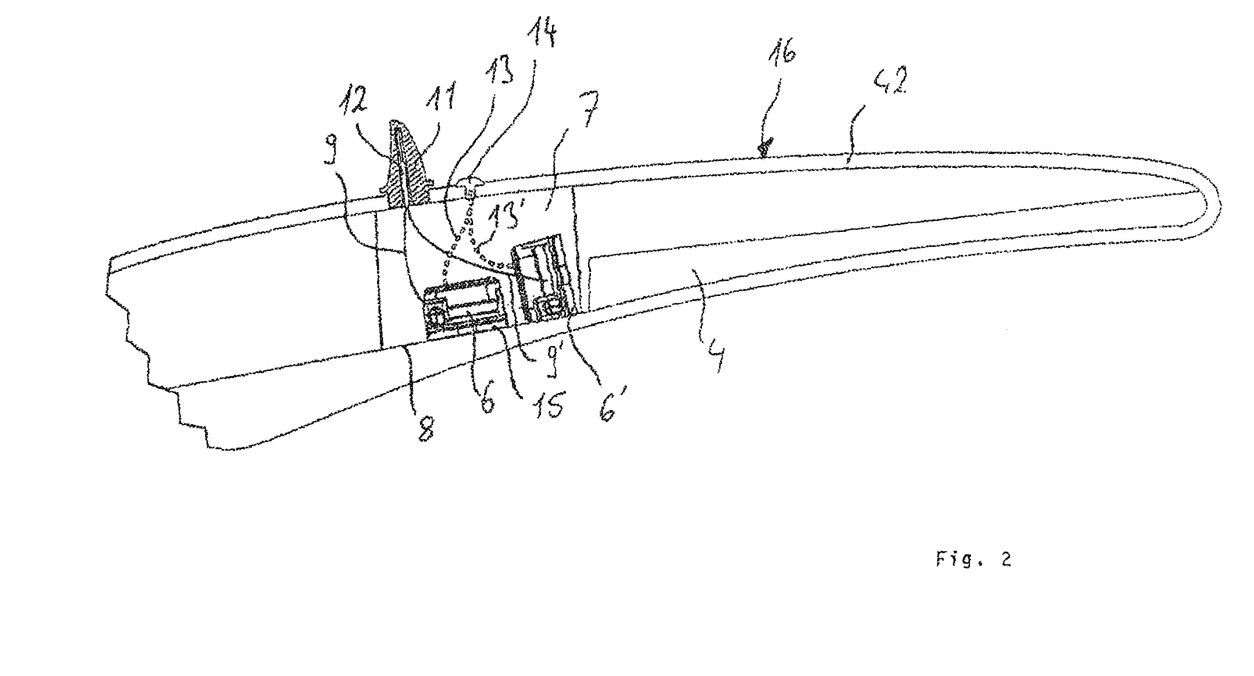
FIG. 2 shows a partial cross-sectioned view of luminaire head of the street light of FIG. 1.

The luminaire head 3 is shown in more detail in FIG. 2. The luminaire head 3 has a lamp 4 which is operated by an electronic ballast (not shown). Control of the electronic ballast and the associated power supply is regulated by a controller 6 in accordance with the invention which is mounted onto a bottom surface 8 inside a partial area 7 of the luminaire housing and has an IP protection class, for example, IP67 or IP68 in accordance with DIN EN 60529. From the controller 6, an antenna cable 9 leads to an antenna 12 located in the interior of a shark fin-like cowling 11. The cowling 11 achieves, in conjunction with the wall 42, a protection class according to IP66, and the cowling 11 is thus tightly seated in the wall 42. The particular outer shape of the cowling 11 has, besides aesthetic aspects, a protective function for the antenna 12. It can, however, be designed otherwise and adapted to the particular design of the street light in which the controller 6 is to be used. A flexible light guide 13 passes light (ambient light) collected by a lens 14 to the controller 6. The lens 14 is arranged on the top of the luminaire head 3 relative to a flat mounting surface. The flexible light guide 13 has a light inlet and a light outlet arranged at respective ends thereof.

The lens 14 or the light inlet of the light guide 13 is preferably arranged on the top of the luminaire head. Arrangement at other places on the luminaire head, for example, with a downward or sideward facing light inlet, can also be advantageous in other situations. If, for example, dawn and dusk are to be detected, or laterally entering light, for example, from stadium lighting, has to be factored out of the remaining ambient light level or brightness, the lens and its associated light guide can be appropriately positioned elsewhere within the luminaire head. By using of a plurality of light inlets, in particular, the controller or the luminaire can be individually adapted to its surroundings using controller software adapted to operate with several light inlets.

To ensure a variable arrangement of the controller 6, the housing is equipped with fastening options permitting variable mounting of the controller 6. Instead of being mounted with a baseplate 15 onto the bottom surface 8 of the luminaire head, the controller can also be mounted to a surface at an angle to the baseplate 15. Accordingly, FIG. 2 also shows the alternative arrangement of a controller 6' which has a light guide 13' and an antenna cable 9' in which the controller 6' is effectively mounted at approximately 90° with respect to the bottom surface 8. Naturally, the light guide 13' and an antenna cable 9' are adapted for the alternative arrangement.

The use of the flexible light guide 13 permits a different positioning or arrangement of the controller within the luminaire head depending on the available space conditions without any problems. A top portion 16 of the luminaire head remains largely free and unaffected. This applies, in particular, for controllers equipped with antennas 12 which, unlike in the embodiment shown in FIG. 2, protrude only as a thin cable out of the luminaire head, in any suitable direction, for example, upwards or downwards. In addition, antennas may be placed inside the luminaire head in the case where the walls of luminaire head walls are made from non-metallic materials, such as, plastic materials.

Figure 3:
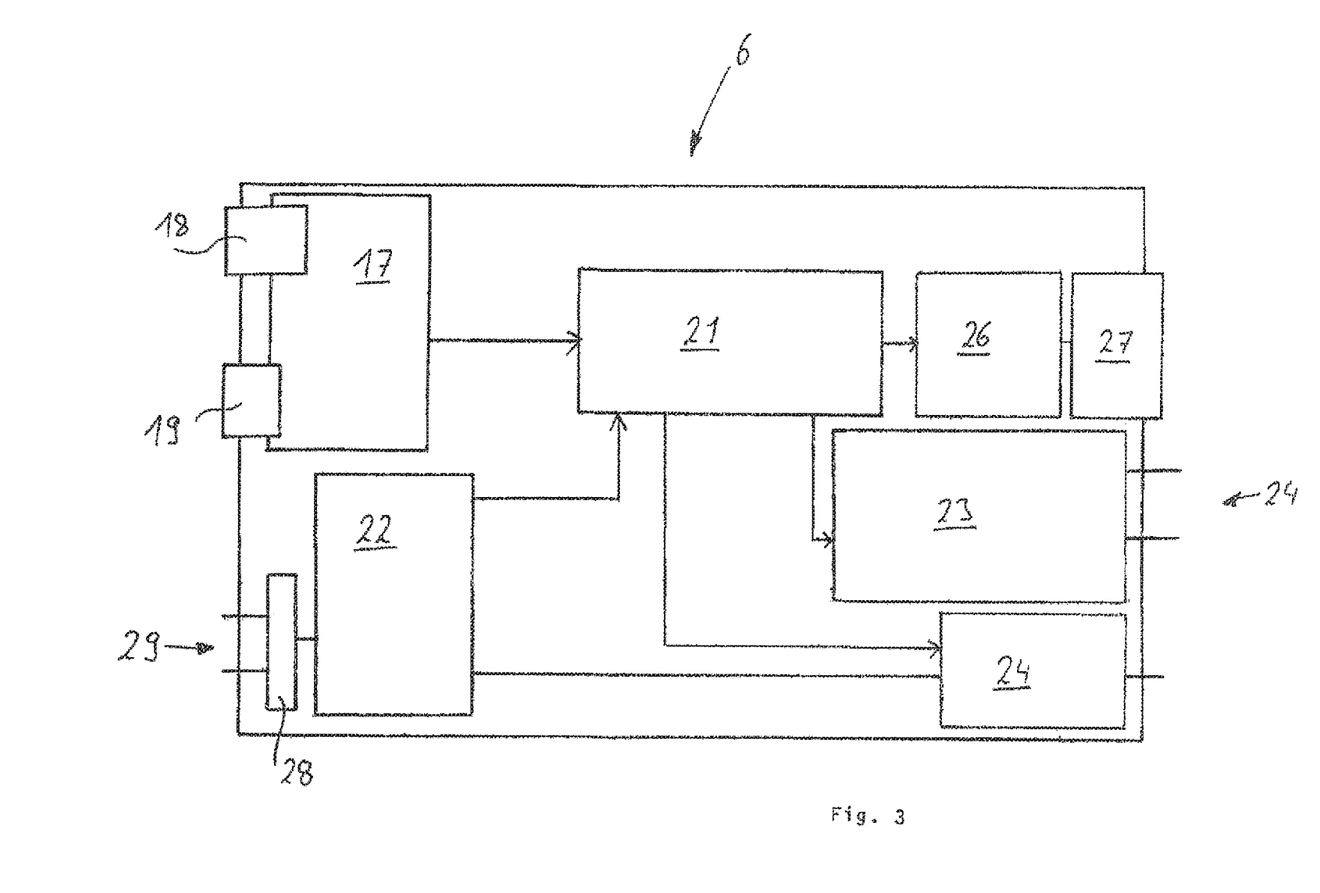
FIG. 3 shows a block diagram of a luminaire controller in accordance with the present invention.

FIG. 3 shows a block diagram of individual functional units of the controller 6 in accordance with the invention.

The controller 6 in accordance with the invention has a sensor processor unit 17 capable of processing the signals from a light sensor 18 and from a temperature sensor 19. The processed signals are passed to a central processor unit 21 representing the core of the controller and, in particular, containing switching and dimming logic, measuring and checking logic, and configuration and calibration logic.

Accordingly, signals from a measuring unit 22 used for measurement of an electrical load applied to the controller 6 are also transmitted to the central processor unit 21. A dimming unit 23 for operating a dimming interface 24 is, in turn, controlled by the central processor unit 21. Control may be in accordance with a DALI standard or with a signal level between 1 and 10 Volts (termed as 1-10V). The central processor unit 21 also controls a power switch 24 for switching the main power line to the load on and off.

A communications unit 26, which can communicate with a network via an antenna 27, is also controlled by the central processor unit 21.

An overvoltage protection 28, arranged between the measuring unit 22 and a main connection 29, is used to protect the controller 6.

Figure 4:
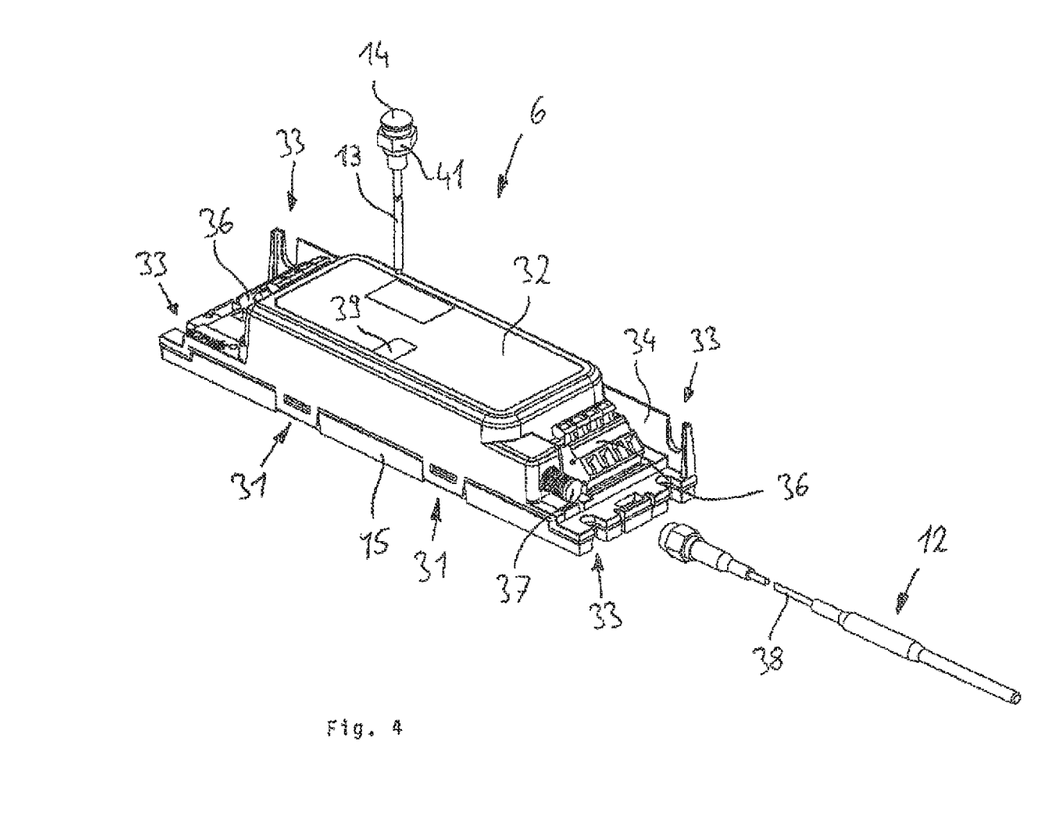
FIG. 4 shows a luminaire controller in accordance with the present invention.

An exemplary embodiment in accordance with the invention of a further yet functionally identical controller 6 is shown in FIG. 4. The controller 6 according to FIG. 4 has a substantially two-part controller housing comprising a baseplate 15 fastened using engaging elements 31 to an upper housing part 32. The upper housing part 32 can be quickly fitted the baseplate 15 due to the engaging elements 31. In the edge areas of the housing formed substantially by the baseplate 15 and the upper housing part 32, fastening areas 33 are provided to fasten the controller 6 within the luminaire head (not shown). Fastening areas 33 comprise recesses which are at least partially enclosed by the housing, and through which fastening elements, in particular, in the form of screws, can be passed to fasten the controller 6 to a mounting surface such as the bottom surface 8, as shown in FIG. 2.

To make the controller 6 better adaptable to a variety of different installation space conditions, the fastening areas 33 are provided not only on the baseplate 15 but also on a wall 34 extending along the side of the controller 6. This wall 34 may be integrally formed as one piece with either the baseplate 15 or the upper housing part 32. The fastening areas 33 not located in the wall 34 are, in the present exemplary embodiment, formed jointly by the baseplate 15 and the upper housing part 32.

Individual interfaces of the controller 6 are provided as terminal strips 36. Associated cables (not shown) can conveniently be fastened thereto, in particular, when the controller 6 is already mounted in position within the luminaire head.

An antenna jack 37 is used for connection to an antenna cable 38 or directly to an antenna 12. A light guide 13, shown interrupted like the antenna cable 38, can be inserted by its lower end having a light outlet into a receptacle, described in more detail below, via a recess 39 in the upper housing part 32.

Figure 5:
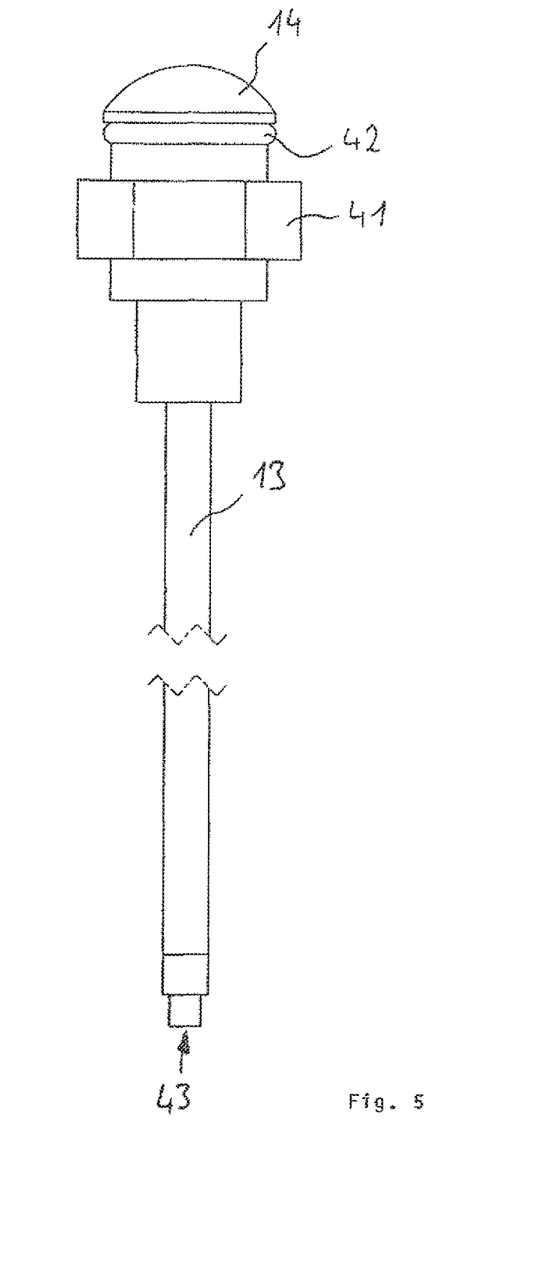
FIG. 5 shows a light guide and lens arrangement in accordance with FIG. 4.

At the end of the light guide 13, as shown in FIG. 5, a lens 14 with a convex outer face is arranged that can be fastened in sealing manner together with the light guide 13 using a fastening means 41 in upper wall 42 (FIG. 2) of a luminaire head. The lens may be made of glass or a suitable plastics material having an appropriate refractive index to direct the light into the light guide.

To do so, the upper end of the light guide has a sealing ring fastened directly below the lens 14 which can hug the wall 42 due to the force exerted by a fastening means 41, and hence seals a recess in the wall 42 for receiving the lens 14 from the surroundings outside the luminaire head.

The lens 14 furthermore has a receptacle for receiving the light inlet (not shown in FIG. 5) of the light guide. A light outlet 43 is located at the lower end of the light guide 13 in FIG. 5.

The light guide itself is provided with an optical core measuring between 1 mm and 2 mm in diameter and having a jacket provided with a diameter measuring 1.5 to 3 mm. This jacket preferably consists of polyethylene. The light guide is preferably made of acrylic. It will, however, be appreciated that the light guide may also be made of glass and the jacket may be made of any suitable plastics material.

Figure 6:
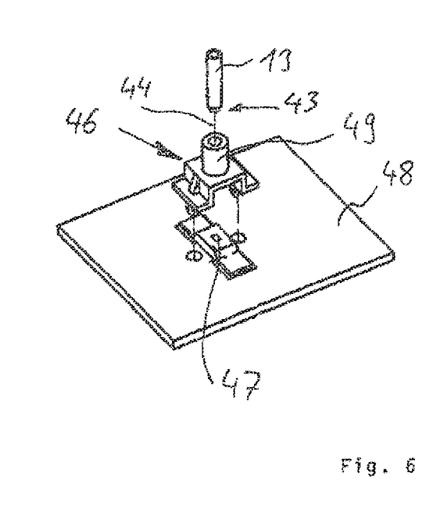
FIG. 6 shows a mounting of a light guide in accordance with FIG. 4.

FIG. 6 also shows a lower end of the light guide 13 with the light outlet 43 which can be plugged into a part 49 of the receptacle 46 in the direction indicated by line 44 and fastened in place. The receptacle itself can, for example, be mounted using mushroom-shaped plugs onto a board 48 having a light sensor 47 positioned above the board 48. The receptacle 46 can be designed with the part 49 slightly conical on the inside in order to achieve clamping of the light guide for direct fixing of the light guide 13. Alternatively or additionally, fastening means can also be used for additional fixing of the light guide.

Fastening means as used herein may comprise screws, bolts, interference fit plugs and projections, mushroom-shaped plugs and the like. It will be appreciated that other forms of fastening means may also be employed for mounting the controller 6 within the luminaire head 3.

It will readily be appreciated that the present invention is not limited to the specific embodiments described herein, and that other embodiments falling within the scope of the invention are possible.

The invention claimed is:

1. A luminaire controller mountable within a luminaire housing, the luminaire controller comprising:
    at least one light sensor for providing a signal relating to ambient light levels; and
    at least one light guide having a light inlet through which ambient light can be received and a light outlet through which ambient light is directed to the at least one light sensor;
    wherein the luminaire controller further comprises a communications unit for communicating with a communications network, the communications unit being operable for checking network communication, and, in the event of an interrupted network communication, the luminaire controller is operable for generating an appropriate signal for a lamp associated therewith depending on the signal relating to the ambient light level.

2. A luminaire controller in accordance with claim 1, wherein each light guide comprises an optical wave guide.

3. A luminaire controller in accordance with claim 1, wherein the light guide includes at least one light filter for filtering out disturbing light.

4. A luminaire controller in accordance with claim 1, wherein the luminaire controller further comprises a receptacle into which the light outlet of the light guide is inserted.

5. A luminaire controller in accordance with claim 4, wherein the luminaire controller further comprises a board on which both the receptacle and the light sensor are mounted.

6. A luminaire controller in accordance with claim 1, wherein a lens is provided at the light inlet of the light guide so that ambient light collected by the lens is directed into the light inlet.

7. A luminaire controller in accordance with claim 1, wherein the luminaire controller further comprises a dimming interface for emitting a dimming signal determined in accordance with the ambient light level.

8. A luminaire controller in accordance with claim 1, wherein the luminaire controller further comprises a switch-on threshold which reflects an ambient light level, the switch-on threshold being adjustable after installation of the luminaire controller.

9. A luminaire controller in accordance with claim 8, wherein the luminaire controller further comprises control software with which the adjustment of the switch-on threshold reflecting an ambient light level is performed.

10. A luminaire controller in accordance with claim 9, wherein the luminaire controller further comprises a radio link by means of which the control software is updated.

11. A luminaire controller in accordance with claim 1, wherein the appropriate signal for the lamp, in the event of an interrupted network communication, comprises a switch-on and switch-off signal.

12. A method for controlling a luminaire comprising a lamp and a luminaire controller, the luminaire controller including at least one light sensor for providing a signal relating to ambient light levels; at least one light guide having a light inlet through which ambient light can be received and a light outlet through which ambient light is directed to the at least one light sensor; and a communications unit for communicating with a communications network; the method comprising:
   passing ambient light to the at least one light sensor via a light guide, the light sensor emitting a signal relating to the ambient light level; and
   varying the light intensity of the lamp in accordance with the signal relating to the ambient light level;
   wherein the method further comprises checking network communication, and, in the event of an interrupted network communication, generating an appropriate signal for the lamp depending on the signal relating to the ambient light level.

13. A method in accordance with claim 12, wherein generating an appropriate signal for the lamp comprises emitting a switch-on and switch-off signal.

14. A method in accordance with claim 12, wherein the luminaire controller further comprises a dimming interface for emitting a dimming signal determined in accordance with the ambient light level, and wherein the method further comprises determining a dimming signal in accordance with the ambient light level.

15. A method in accordance with claim 12, wherein the method further comprises calibrating the light sensor using a measurement value of the light sensor recorded at a predetermined point in time.

16. A method in accordance with claim 15, wherein the predetermined point in time comprises the time at which the lamp is switched on, and using the measurement value of the light sensor at switch on as the new reference value.

17. A method in accordance with claim 12, wherein the method further comprises adjusting a switch-on threshold reflecting an ambient light level after installation of the controller.

18. A method in accordance with claim 17, wherein the method further comprises using control software to perform the adjustment of the switch-on threshold reflecting an ambient light level.

19. A method in accordance with claim 18, wherein the method further comprises using a radio link to update the control software.

20. A luminaire comprising a luminaire controller in accordance with claim 1.

* * * * *